US012809807B2

(12) United States Patent
Paul et al.

(10) Patent No.: US 12,809,807 B2
(45) Date of Patent: Nov. 24, 2026

(54) BANDWIDTH MANAGEMENT FOR REAL-TIME AND BEST-EFFORT CLIENTS UNDER LOADED SYSTEM CONDITIONS

(71) Applicants: Advanced Micro Devices, Inc, Santa Clara, CA (US); ATI Technologies ULC, Markham (CA)

(72) Inventors: Indrani Paul, Austin, TX (US); Benjamin Tsien, Fremont, CA (US); David Kramer, Austin, TX (US); Wonje Choi, Austin, TX (US); Adam Neil Calder Clark, Victoria (CA)

(73) Assignees: Advanced Micro Devices, Inc, Santa Clara, CA (US); ATI Technologies ULC, Markham (CA)

(*) Notice: Subject to any disclaimer, the term of this patent is extended or adjusted under 35 U.S.C. 154(b) by 0 days.

(21) Appl. No.: 18/999,798

(22) Filed: Dec. 23, 2024

(65) Prior Publication Data

US 2026/0178531 A1 Jun. 25, 2026

Related U.S. Application Data

(60) Provisional application No. 63/617,309, filed on Jan. 3, 2024.

(51) Int. Cl.

| | |
|---|---|
| ***G06F 13/42*** | (2006.01) |
| ***G06F 1/324*** | (2019.01) |
| ***G06F 9/445*** | (2018.01) |

(52) U.S. Cl.

CPC .............. *G06F 13/42* (2013.01); *G06F 1/324* (2013.01); *G06F 9/44505* (2013.01)

(58) Field of Classification Search

CPC ...... G06F 13/42; G06F 1/324; G06F 9/44505; G06F 1/3206; G06F 1/3225; G06F 1/3228; G06F 1/3275; G06F 1/3296; G06F 3/0634; G06F 3/0679; G06F 3/0625

See application file for complete search history.

(56) References Cited

U.S. PATENT DOCUMENTS

| | | | | |
|---|---|---|---|---|
| 2005/0002335 | A1* | 1/2005 | Adamczyk | H04L 47/24 370/230 |
| 2013/0003543 | A1* | 1/2013 | Ludwig | H04L 47/78 370/230 |
| 2014/0108740 | A1 | 4/2014 | Rafacz et al. | |
| 2014/0355427 | A1 | 12/2014 | Cheng | |

(Continued)

OTHER PUBLICATIONS

"International Search Report and Written Opinion", PCT Application No. PCT/US2024/062386, Apr. 16, 2025, 11 pages.

*Primary Examiner* — Tim T Vo
(74) *Attorney, Agent, or Firm* — FIG. 1 Patents

(57) ABSTRACT

A power manager of an apparatus exposes an application programming interface (API) usable for applications to specify priority and quality-of-service (QoS) parameters (e.g., bandwidth requirements) for a workload. An application, for instance, specifies the priority and QoS parameters for a workload to be processed using a hardware compute unit. The power manager employs the priority and QoS parameters to configure the bandwidth allocation to access a memory system. In particular, the bandwidth allocation and prioritization are dynamically extended to real-time and best-effort workloads to satisfy specified QoS parameters for inference workloads and improve user experiences.

20 Claims, 6 Drawing Sheets

(56) References Cited

U.S. PATENT DOCUMENTS

| | | | |
|---|---|---|---|
| 2019/0179757 | A1 | 6/2019 | Walker et al. |
| 2020/0210332 | A1 | 7/2020 | Steiner et al. |
| 2021/0200707 | A1* | 7/2021 | Israel Vijayponraj ....................... G06F 13/4027 |
| 2022/0113790 | A1* | 4/2022 | Doshi ................... G06F 21/577 |
| 2022/0326999 | A1 | 10/2022 | Penney et al. |

* cited by examiner

BANDWIDTH MANAGEMENT FOR REAL-TIME AND BEST-EFFORT CLIENTS UNDER LOADED SYSTEM CONDITIONS

BACKGROUND

Inference models, such as machine learning and trained artificial intelligence (AI) models, are becoming increasingly popular for improving task accuracy and efficiency. The speed of inference applications is affected by the allocated bandwidth for virtual channel access to dynamic random access memory (DRAM) or other memory. To address this issue, neural processing units (NPUs), inference processing units (IPUs), neural network engines (NNEs), and accelerator processing units (APUs) have been developed to optimize inference models. However, these processors are typically implemented in devices that employ memory access policies to allocate bandwidth among multiple applications, with a preference for real-time applications. Unfortunately, these memory access policies can lead to insufficient bandwidth being available for inference applications, resulting in slower inference models and degraded user experience.

BRIEF DESCRIPTION OF THE DRAWINGS

The detailed description is described with reference to the accompanying figures.

DETAILED DESCRIPTION

Figure 1:
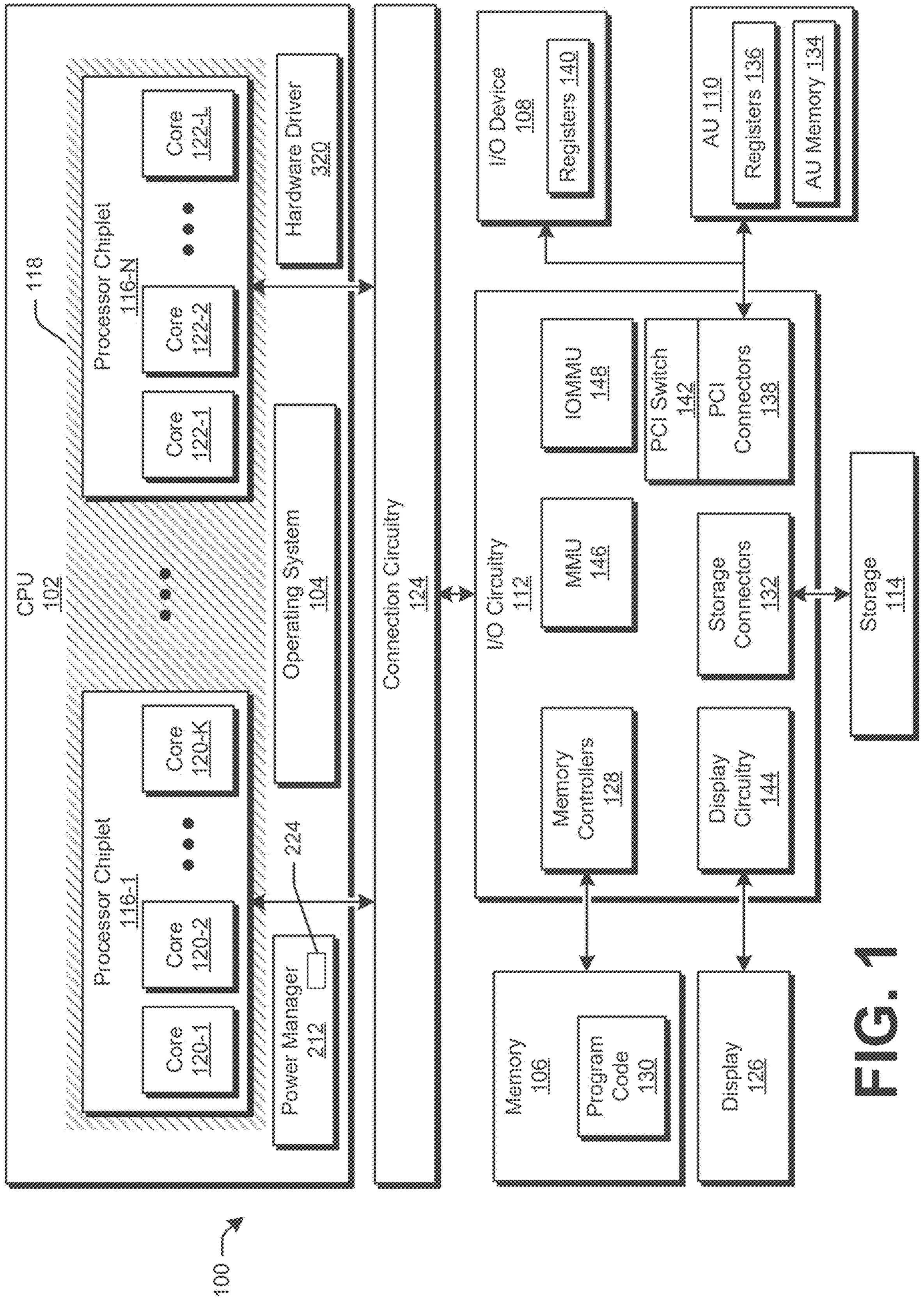
FIG. 1 is a block diagram of a processing system configured to execute one or more applications in accordance with one or more implementations.

The hardware design of processors continually evolves to provide ever-increasing amounts and varieties of functionality in support of corresponding increases in application functionality. For example, processors have increased computational power to address the increasing demand for inference and other machine-learning applications. As a result, managing the resources allocated for executing workloads (e.g., inference and AI workloads) from the clients or applications using various hardware designs and operating policies has also experienced a corresponding increase in complexity, sometimes hindering device operation. For example, a priority parameter is used to differentiate between real-time and non-real-time (e.g., normal priority or best-effort) workloads. In real-world scenarios, applications typically default to identifying as "real-time" workloads, resulting in multiple workload requests causing performance or efficiency degradation (e.g., in accessing a memory system). In another example, high-level hints are used to indicate desired modes of operation but do not provide insight into actual resource utilization and processing goals for a corresponding workload. This often results in inefficient allocation of memory access and suboptimal operation of devices that utilize these resources.

To solve these problems, a power manager of a system-on-chip (SoC) with multiple processor cores inference accelerator) exposes an application programming interface (API) to applications to specify the priority and QoS parameters (e.g., latency, throughput, deadline, computational time). A client (e.g., an inference accelerator), for instance, specifies the priority and QoS parameters for memory access while processing a workload. In an example involving image processing, the priority parameter identifies the workload as "real-time," and the QoS parameters specify a bandwidth requirement of 36 gigabytes per second (GB/s), with 24 GB/s for read operations and 12 GB/s for write operations for use in object recognition by a machine-learned or AI model executed by the client.

The power manager employs the priority and QoS parameters as a basis to configure bandwidth allocations to a memory system (e.g., DRAM) for individual processors (or clients) of the SoC. The bandwidth allocations are configured such that the available memory access resources comply with the priority and QoS parameters. The power manager, for instance, throttles other applications or raises the bandwidth priority of the inference application to ensure sufficient bandwidth resources are guaranteed to support the priority and QoS parameters. This improves device operation through targeted optimization of memory bandwidth resources, especially as the bandwidth requirements and priority of inference applications increase in consumer devices.

In some aspects, the techniques and systems described herein relate to a device comprising: a power manager configured to: assign, to a first application of one or more processor cores, an initial guaranteed bandwidth for accessing data stored in a memory, the initial guaranteed bandwidth being based on a first priority parameter and a first quality-of-service (QoS) parameter for the first application to process a workload, and in response to a determination that the initial guaranteed bandwidth for the first application is not sufficient to satisfy the first QoS parameter and that there is no unassigned bandwidth, assign an updated guaranteed bandwidth to the first application by reducing bandwidth allocated to one or more second applications of the one or more processor cores, the updated guaranteed bandwidth being larger than the initial guaranteed bandwidth.

In some aspects, the techniques and systems described herein relate to a device wherein the power manager is further configured to throttle the bandwidth allocated to the one or more second applications by reducing the bandwidth allocated to the one or more second applications having a best-effort priority parameter.

In some aspects, the techniques and systems described herein relate to a device wherein the power manager is further configured to: in response to throttling the bandwidth allocated to the one or more second applications, determine whether the updated guaranteed bandwidth is sufficient to satisfy the first QoS parameter, and in response to determining that the updated guaranteed bandwidth is not sufficient to satisfy the first QoS parameters, raise a bandwidth priority parameter of the first application from a first level to a second level, the second level having a higher priority in memory-access ordering than the first level.

In some aspects, the techniques and systems described herein relate to a device wherein the power manager is further configured to: in response to determining that the updated guaranteed bandwidth is not sufficient to satisfy the first QoS parameter, throttle the bandwidth allocated to the one or more second applications based on an amount of bandwidth being consumed by the one or more second applications.

In some aspects, the techniques and systems described herein relate to a device wherein the first application and the one or more second applications default to the first level.

In some aspects, the techniques and systems described herein relate to a device wherein the power manager is further configured to determine the first priority parameter is equal to a real-time status by identifying that the first application has a hard-minimum power setting.

In some aspects, the techniques and systems described herein relate to a device wherein the power manager is further configured to maintain the initial guaranteed bandwidth or the updated guaranteed bandwidth in response to the first priority parameter being equal to the real-time status and the first application being subject to power throttling by reducing a voltage or frequency setting of the one or more processor cores.

In some aspects, the techniques and systems described herein relate to a device wherein the power manager is further configured to: in response to the first priority parameter being equal to a best-effort priority and the first QoS parameter not having a specified value, set the initial guaranteed bandwidth based on guaranteed bandwidths allocated to the one or more second applications.

In some aspects, the techniques and systems described herein relate to a device wherein the power manager is further configured to: in response to the first priority parameter being equal to a best-effort priority and the first QoS parameter specifying a minimum bandwidth requirement, determine whether the second priority parameters of the one or more second applications have a higher priority level, and in response to the second priority parameters not having a higher priority level than the first priority parameter and the initial guaranteed bandwidth not being sufficient to satisfy the first QoS parameter, throttle bandwidth allocations to the one or more second applications to assign the updated guaranteed bandwidth to the first application.

In some aspects, the techniques and systems described herein relate to a device wherein the power manager is further configured to maintain the initial guaranteed bandwidth for the first application: in response to the one or more second applications not having a higher priority level than the first application and determining that the initial guaranteed bandwidth is sufficient to satisfy the first QoS parameter, or in response to the one or more second applications having a higher priority level than the first application and determining that the initial guaranteed bandwidth is sufficient to satisfy the first QoS parameter.

In some aspects, the techniques and systems described herein relate to a device wherein the first application is an inference model, a machine learning model, or an artificial intelligence model.

In some aspects, the techniques and systems described herein relate to a system that includes: a power manager associated with a processor core and configured to: receive an indication of a priority parameter and a quality-of-service (QoS) parameter for processing a workload, and assign, to the processor core, an initial guaranteed bandwidth for accessing data stored in a memory operatively connected to the processor core, the initial guaranteed bandwidth being based on the priority parameter and the QoS parameter, and a memory controller associated with processor core and one or more other processor cores, the memory controller configured to: in response to receiving an indication that the initial guaranteed bandwidth is not sufficient to satisfy the QoS parameter and a determining that there is no unassigned bandwidth available, throttle bandwidth allocation to the one or more other processor cores to provide an updated guaranteed bandwidth to the processor core, the updated guaranteed bandwidth being larger than the initial guaranteed bandwidth.

In some aspects, the techniques and systems described herein relate to a system wherein the priority parameter indicates the workload has a best-effort priority and other priority parameters associated with the one or more other processors indicate a same or lower priority.

In some aspects, the techniques and systems described herein relate to a system wherein the power manager is further configured to: determine a power setting for the processor core based on the priority parameter and the QoS parameter, the power setting indicating a clock frequency associated with the processor core, and determine the initial guaranteed bandwidth or the updated guaranteed bandwidth for the processor core based at least in part on the clock frequency.

In some aspects, the techniques and systems described herein relate to a system, wherein the workload of the processor core includes execution of a machine learning model, inference model, or an artificial intelligence model.

In some aspects, the techniques and systems described herein relate to a system wherein the power manager is further configured to: receive operation data describing operating characteristics of the processor core or the one or more other processor cores, and determine the initial guaranteed bandwidth or the updated guaranteed bandwidth for the processor core based at least in part on the operating characteristics.

In some aspects, the techniques and systems described herein relate to a system wherein the processor core comprises an inference processing unit, a neural network engine, an intelligence processing unit, a neural processing unit, an artificial intelligence accelerator, or a vision processing unit.

In some aspects, the techniques and systems described herein relate to a system wherein the memory comprises dynamic random access memory and the memory controller comprises a data fabric operatively connected to the processor core and the memory.

In some aspects, the techniques and systems described herein relate to a method that includes: receiving an input via an application programming interface (API) from an application of a processor core, the input specifying a priority parameter and a quality-of-service (QoS) parameter for processing a workload associated with the application; determining, for the application, an initial guaranteed bandwidth for accessing data stored in a memory to process the workload, the initial guaranteed bandwidth being based at least in part on the priority parameter and the QoS parameter, and in response to determining that the initial guaranteed bandwidth for the application is not sufficient to satisfy the QoS parameter and that there is no unassigned bandwidth for the memory, assigning an updated guaranteed bandwidth to the application by reducing bandwidth allocated to other applications, the updated guaranteed bandwidth being larger than the initial guaranteed bandwidth.

In some aspects, the techniques and systems described herein relate to a method that includes in response to determining that the updated guaranteed bandwidth is not sufficient to satisfy the QoS parameter, raising a bandwidth priority parameter level of the application from a first level to a second level, the second level providing the application a higher priority in memory access ordering.

FIG. 1 is a block diagram of a processing system configured to execute one or more applications in accordance with one or more implementations.

In particular, FIG. 1 includes a processing system 100 configured to execute one or more applications (e.g., application 210 of FIG. 2), such as computing applications (e.g., machine-learning applications, neural network applications, high-performance computing applications, databasing applications, gaming applications), graphics applications, and the like. Examples of devices (e.g., the device 202 of FIG. 2) in which the processing system 100 is implemented include but are not limited to a server computer, personal computer (e.g., desktop or tower computer), smartphone or another wireless phone, tablet or phablet computer, notebook computer, laptop computer, wearable device (e.g., smartwatch, augmented reality headset or device, virtual reality headset or device), entertainment device (e.g., gaming console, portable gaming device, streaming media player, digital video recorder, music or another audio playback device, television, set-top box), Internet of Things (IoT) device, automotive computer or computer for another type of vehicle, networking device, medical device or system, and other computing devices or systems.

In the illustrated example, the processing system 100 includes a central processing unit (CPU) 102. In one or more implementations, the CPU 102 is configured to run an operating system (OS) 104 that manages the execution of applications. For example, the OS 104 is configured to schedule the execution of tasks (e.g., instructions) for applications, allocate portions of resources (e.g., system memory 106, CPU 102, input/output (I/O) device 108, accelerator unit (AU) 110, storage 114) for the execution of tasks for the applications, provide an interface to I/O devices (e.g., I/O device 108) for the applications, or any combination thereof.

Figure 2:
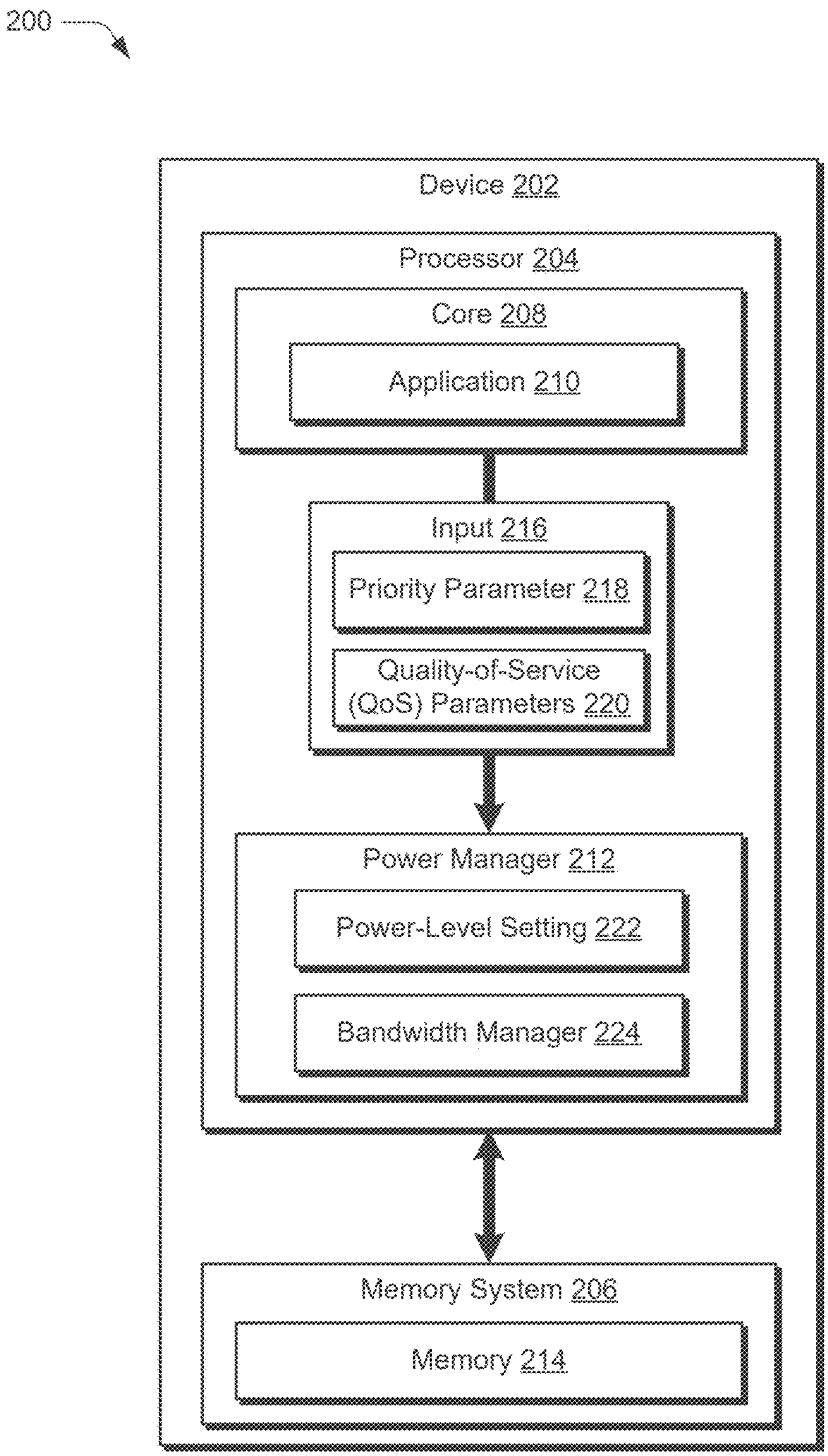
FIG. 2 is a block diagram of a non-limiting example system that implements bandwidth management techniques for real-time and best-effort clients under loaded system conditions.
Figure 3:
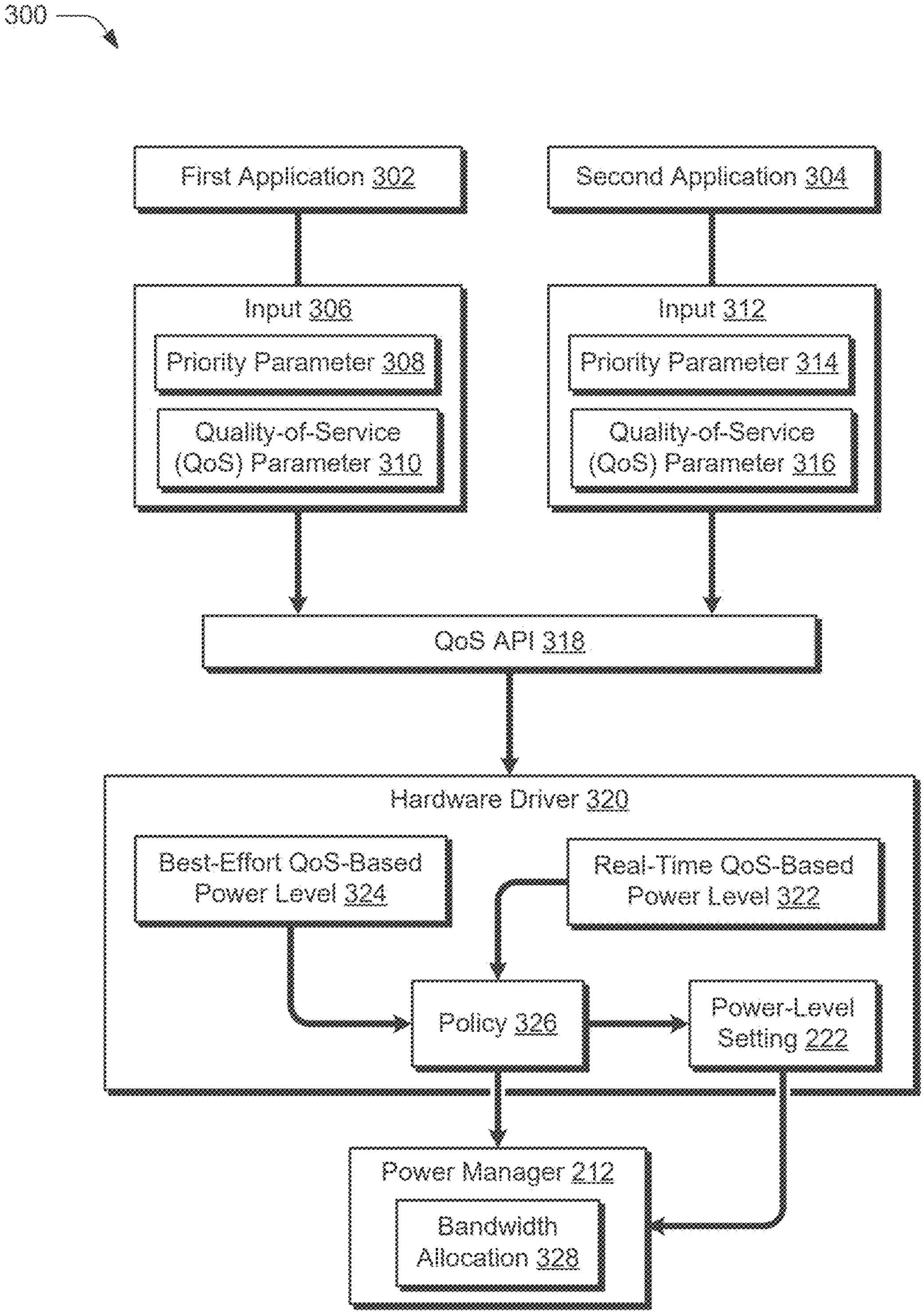
FIG. 3 is a block diagram of an example block diagram of a framework for bandwidth management for real-time and best-effort clients under loaded system conditions.

In this example, the power manager 212 with the bandwidth manager 224 of FIG. 2 and the hardware driver 320 of FIG. 3 are depicted as part of CPU 102. In variations, the power manager 212 or the hardware driver 320 are included in and/or implemented by one or more different components of the processing system 100, such as the AU 110 or the I/O circuitry 112.

The CPU 102 includes one or more processor chiplets 116, which are communicatively coupled by a data fabric 118 in one or more implementations. Each processor chiplet 116, for example, includes one or more processor cores 120, 122 configured to execute one or more series of instructions concurrently, also referred to herein as "threads", for an application. Further, the data fabric 118 communicatively couples each processor chiplet 116-N of the CPU 102 such that each processor core (e.g., processor cores 120) of a first processor chiplet (e.g., 116-1) is communicatively coupled to each processor core (e.g., processor cores 122) of one or more other processor chiplets 116.

Though the example embodiment in FIG. 1 shows a first processor chiplet (116-1) having three processor cores (120-1, 120-2, 120-K) representing a K number of processor cores 122 and a second processor chiplet (116-N) having three processor cores (e.g., 122-1, 122-2, 122-L) representing an L number of processor cores 122, in other implementations (L being an integer number greater than or equal to one), each processor chiplet 116 may have any number of processor cores 120, 122. For example, each processor chiplet 116 can have the same number of processor cores 120, 122 as one or more other processor chiplets 116, a different number of processor cores 120, 122 as one or more other processor chiplets 116, or both.

Examples of connections that are usable to implement the data fabric 118 include but are not limited to buses (e.g., a data bus, a system, an address bus), interconnects, memory channels, and silicon vias, traces, and planes. Other example connections include optical connections, fiber optic connections, and/or connections or links based on quantum entanglement.

Additionally, within the processing system 100, the CPU 102 is communicatively coupled to an I/O circuitry 112 by a connection circuitry 124. For example, each processor chiplet 116 of the CPU 102 is communicatively coupled to the I/O circuitry 112 by the connection circuitry 124. The connection circuitry 124 includes, for example, one or more data fabrics, buses, buffers, queues, and the like. The I/O circuitry 112 is configured to facilitate communications between two or more components of the processing system 100 such as between the CPU 102, system memory 106, display 126, universal serial bus (USB) devices, peripheral component interconnect (PCI) devices (e.g., I/O device 108, AU 110), storage 114, and the like.

As an example, system memory 106 includes any combination of one or more volatile memories and/or one or more non-volatile memories, examples of which include dynamic random-access memory (DRAM), static random-access memory (SRAM), non-volatile RAM, and the like. To manage access to the system memory 106 by CPU 102, the I/O device 108, the AU 110, and/or any other components, the I/O circuitry 112 includes one or more memory controllers 128. The memory controllers 128, for example, include circuitry configured to manage and fulfill memory access requests issued from the CPU 102, the I/O device 108, the AU 110, or any combination thereof. Examples of such requests include read requests, write requests, fetch requests, pre-fetch requests, or any combination thereof. That is to say, the memory controllers 128 are configured to manage access to the data stored at one or more memory addresses within the system memory 106, such as by CPU 102, I/O device 108, and/or AU 110.

When an application is to be executed by processing system 100, the OS 104 running on the CPU 102 is configured to load at least a portion of program code 130 (e.g., an executable file) associated with the application from, for example, a storage 114 into system memory 106. This storage 114, for example, includes a non-volatile storage such as a flash memory, solid-state memory, hard disk, optical disc, or the like configured to store program code 130 for one or more applications.

To facilitate communication between the storage 114 and other components of processing system 100, the I/O circuitry 112 includes one or more storage connectors 132 (e.g., universal serial bus (USB) connectors, serial AT attachment (SATA) connectors, PCI Express (PCIe) connectors) configured to communicatively couple storage 114 to the I/O circuitry 112 such that I/O circuitry 112 is capable of routing signals to and from the storage 114 to one or more other components of the processing system 100.

In association with executing an application, in one or more scenarios, the CPU 102 is configured to issue one or more instructions (e.g., threads) to be executed for an application to the AU 110. The AU 110 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 110 includes one or more compute units that concurrently execute one or more threads of an application and store data resulting from the execution of these threads in AU memory 134. This AU memory 134, for example, includes any combination of one or more volatile memories and/or non-volatile memories, examples of which include caches, video RAM (VRAM), or the like. In one or more implementations, these compute units are also configured to execute these threads based on the data stored in one or more physical registers 136 of the AU 110.

To facilitate communication between the AU 110 and one or more other components of processing system 100, the I/O circuitry 112 includes or is otherwise connected to one or more connectors, such as PCI connectors 138 (e.g., PCIe connectors) each including circuitry configured to communicatively couple the AU 110 to the I/O circuitry such that the I/O circuitry 112 is capable of routing signals to and from the AU 110 to one or more other components of the processing system 100. Further, the PCI connectors 138 are configured to communicatively couple the I/O device 108 to the I/O circuitry 112 such that the I/O circuitry 112 is capable of routing signals to and from the I/O device 108 to one or more other components of the processing system 100.

By way of example and not limitation, the I/O device 108 includes one or more camera systems, keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 108 is configured to execute one or more operations, tasks, instructions, or any combination thereof based on one or more physical registers 140 of the I/O device 108. In one or more implementations, such physical registers 140 are configured to maintain data (e.g., operands, instructions, values, variables) indicating one or more operations, tasks, or instructions to be performed by the I/O device 108.

To manage communication between components of the processing system 100 (e.g., AU 110, I/O device 108) that are connected to PCI connectors 138, and one or more other components of the processing system 100, the I/O circuitry 112 includes PCI switch 142. The PCI switch 142, for example, includes circuitry configured to route packets to and from the components of the processing system 100 connected to the PCI connectors 138 as well as to the other components of the processing system 100. As an example, based on address data indicated in a packet received from a first component (e.g., CPU 102), the PCI switch 142 routes the packet to a corresponding component (e.g., AU 110) connected to the PCI connectors 138.

Based on the processing system 100 executing a graphics application, for instance, the CPU 102, the AU 110, or both are configured to execute one or more instructions (e.g., draw calls) such that a scene including one or more graphics objects is rendered. After rendering such a scene, the processing system 100 stores the scene in the storage 114, displays the scene on the display 126, or both. The display 126, for example, includes a cathode-ray tube (CRT) display, liquid crystal display (LCD), light emitting diode (LED) display, organic light emitting diode (OLED) display, or any combination thereof. To enable the processing system 100 to display a scene on the display 126, the I/O circuitry 112 includes display circuitry 144. The display circuitry 144, for example, includes high-definition multimedia interface (HDMI) connectors, DisplayPort connectors, digital visual interface (DVI) connectors, USB connectors, and the like, each including circuitry configured to communicatively couple the display 126 to the I/O circuitry 112. Additionally or alternatively, the display circuitry 144 includes circuitry configured to manage the display of one or more scenes on the display 126 such as display controllers, buffers, memory, or any combination thereof.

Further, the CPU 102, the AU 110, or both are configured to concurrently run one or more virtual machines (VMs), which are each configured to execute one or more corresponding applications. To manage communications between such VMs and the underlying resources of the processing system 100, such as any one or more components of processing system 100, including the CPU 102, the I/O device 108, the AU 110, and the system memory 106, the I/O circuitry 112 includes memory management unit (MMU) 146 and input-output memory management unit (IOMMU) 148. The MMU 146 includes, for example, circuitry configured to manage memory requests, such as from the CPU 102 to the system memory 106. For example, the MMU 146 is configured to handle memory requests issued from the CPU 102 and associated with a VM running on the CPU 102. These memory requests, for example, request access to read, write, fetch, or pre-fetch data residing at one or more virtual addresses (e.g., guest virtual addresses) each indicating one or more portions (e.g., physical memory addresses) of the system memory 106. Based on receiving a memory request from the CPU 102, the MMU 146 is configured to translate the virtual address indicated in the memory request to a physical address in the system memory 106 and to fulfill the request. The IOMMU 148 includes, for example, circuitry configured to manage memory requests (memory-mapped I/O (MMIO) requests) from the CPU 102 to the I/O device 108, the AU 110, or both, and to manage memory requests (direct memory access (DMA) requests) from the I/O device 108 or the AU 110 to the system memory 106. For example, to access the registers 140 of the I/O device 108, the registers 136 of the AU 110, and/or the AU memory 134, the CPU 102 issues one or more MMIO requests. Such MMIO requests each request access to read, write, fetch, or pre-fetch data residing at one or more virtual addresses (e.g., guest virtual addresses) which each represent at least a portion of the registers 140 of the I/O device 108, the registers 136 of the AU 110, or the AU memory 134, respectively. As another example, to access the system memory 106 without using the CPU 102, the I/O device 108, the AU 110, or both are configured to issue one or more DMA requests. Such DMA requests each request access to read, write, fetch, or pre-fetch data residing at one or more virtual addresses (e.g., device virtual addresses) which each represent at least a portion of the system memory 106. Based on receiving an MMIO request or DMA request, the IOMMU 148 is configured to translate the virtual address indicated in the MMIO or DMA request to a physical address and fulfill the request.

In variations, the processing system 100 can include any combination of the components depicted and described. For example, in at least one variation, the processing system 100 does not include one or more of the components depicted and described in relation to FIG. 1. Additionally or alternatively, in at least one variation, the processing system 100 includes additional and/or different components from those depicted. The processing system 100 is configurable in a variety of ways with different combinations of components in accordance with the described techniques.

FIG. 2 is a block diagram of a non-limiting example system 200 to implement techniques for bandwidth management for real-time and best-effort clients under loaded system conditions. Specifically, the system 200 depicts a device 202 that includes a processor 204 and a memory system 206 communicatively coupled with one another (e.g., via at least one bus structure, via a network-on-chip, or any type of interconnect that enables transfer of data between various system components described herein).

The techniques described herein are usable by a wide range of device configurations, including, by way of example and not limitation, computing devices, servers, mobile devices (e.g., wearables, mobile phones, tablets, laptops, augmented-reality devices, virtual-reality devices, headsets), processors (e.g., graphics processing units, central processing units, and accelerators), digital signal processors, machine learning inference accelerators, and other apparatus configurations. Additional examples include artificial intelligence training accelerators, cryptography and compression accelerators, network packet processors, and video coders and decoders.

The processor 204 includes at least one core 208, which may also be interchangeably referred to as a processing core. The core 208 is an electronic circuit (e.g., an integrated circuit) that performs various operations on or using data in the memory system 206. Example configurations of the processor 204 and/or core 208 include, but are not limited to, a central processing unit (CPU), graphics processing unit (GPU), field programmable gate array (FPGA), accelerated processing unit (APU), neural network engine (NNE), neural processing unit (NPU), inference processing unit (IPU), and a digital signal processor (DSP). Although one core 208 is depicted in the illustrated example, the processor 204 includes multiple cores 208 (e.g., as part of a multi-core system-on-chip (SoC)).

The core 208 is a processing unit that reads and executes instructions (e.g., of a program), including adding data, moving data, performing computations on data, and branching. In particular, the core 208 executes an application 210 that requires memory access (e.g., to read or write data) to the memory system 206. The application 210 represents any software configurable as instructions that are executable by the core 208. In some implementations, application 210 employs machine-learning and other inference models to perform a computing task (e.g., image processing, artificial intelligence functioning) that requires access to the memory system 206.

The processor 204 also includes a power manager 212 that specifies the configuration of the core 208 for executing the application 210 and other cores or clients of the processor 204 to execute other applications or workloads. In particular, the power manager 212 is representative of functionality to control power (e.g., voltage or frequency) and bandwidth allocated for execution of the application 210 by the core 208. To do so, the power manager 212 specifies a variety of characteristics for the core 208, including the number of processing resources, bandwidth guarantees for accessing the memory system 206, clock speeds, operating voltages, and so forth to be used in executing the application 210.

The power manager 212 is generally implemented in digital circuitry (e.g., as an integrated circuit) with a combination of hardware, firmware, and/or software. In some implementations, the power manager 212 is communicatively located between and interfaces with the core 208 and the memory system 206. In another example, the power manager 212 is communicatively coupled to a memory controller or data fabric that manages the flow of data to and from the memory (e.g., via data fabric or network-on-chip linkage).

Memory system 206 is implemented as a printed circuit board, on which memory 214 (e.g., physical memory) is placed (e.g., via physical and communicative coupling using one or more sockets). In other words, the memory 214 is mounted on a printed circuit board. This construction, along with the communicative couplings (e.g., control signals and buses) and one or more sockets integral to the printed circuit board, form the memory system 206. Examples of the memory system 206 include a TransFlash memory system, single in-line memory module (SIMM), dual in-line memory module (DIMM), small outline DIMM (SO-DIMM), and compression-attached memory system.

In one or more implementations, the memory system 206 is a single integrated circuit device that incorporates the memory 214 on a single chip. In some examples, the memory system 206 is formed using multiple chips of memory 214 that are vertically ("3D") stacked together, are placed side-by-side on an interposer or substrate, or are assembled via a combination of vertical stacking or side-by-side placement.

Memory 214 is a device or system that is used to store data, such as for immediate use in a device (e.g., by the core 208). In one or more implementations, the memory 214 corresponds to semiconductor memory, where data is stored within memory cells on one or more integrated circuits. In at least one example, memory 214 corresponds to or includes volatile memory, examples of which include random-access memory (RAM), dynamic random-access memory (DRAM), synchronous dynamic random-access memory (SDRAM), and static random-access memory (SRAM). Alternatively, or in addition, the memory 214 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Allocation of bandwidth or bandwidth guarantees for accessing the memory system 206 by the core 208 and other processing units within the processor 204 is controlled by the power manager 212. A memory controller or data fabric generally controls access to the memory system 206 for the core 208 (and other processing units within the processor 204).

In preparation for executing application 210 (e.g., involving a machine-learning or other inference model), the power manager 212 receives an input 216 from the core 208 or application 210. The input 216 specifies a priority parameter 218 and quality-of-service (QoS) parameters 220 associated with the application 210 or a workload (e.g., collection of instructions, data, and so forth) thereof. The priority parameter 218 indicates the priority of the application's workload. In other words, the priority parameter 218 specifies whether the workload is to be processed in "real-time" or "not real-time" (i.e., "best effort" or "normal"), with real-time priority being higher than "best-effort" priority. For example, the priority parameter 218 indicates a real-time or best-effort priority for the workload. In other implementations, the priority parameter may include additional priority states, including one or more states between real-time and best-effort (e.g., "medium" priority) or with higher or lower priority than real-time and best-effort, respectively. The QoS parameters 220 indicate a bandwidth requirement (e.g., 36 GB/s), throughput, deadline, or latency required for the workload.

Conventional bandwidth management techniques (e.g., virtual channel QoS policies) allocate bandwidth (e.g., the rate at which data can be read from or stored into the memory system 206) to the core 208 (and other processing units of the processor 204) as necessitated by their respective workloads or priorities. In some scenarios, the device 202 is experiencing loaded system conditions where multiple cores or processing units are executing different applications and the memory access requests by the processor 204 near or exceed the total available bandwidth of the memory system 206 or associated memory controller. In response to these scenarios, conventional bandwidth management techniques assign guaranteed bandwidth to the core 208 and other processing units of the processor 204. The guaranteed bandwidth is an allocation of a minimum data rate (e.g., through a combination of transfer speed or prioritization and an allocation of communication channels) at which the core 208 or other processor units can access (e.g., read from or write to) the memory system 206. However, the guaranteed bandwidth for core 208 is insufficient in an increasing number of scenarios, especially where application 210 uses machine-learning or inference models to provide particular functionality and other cores are providing bandwidth-intense applications (e.g., video processing, online gaming). As a result, the QoS parameters for some applications are not satisfied, and user experience is degraded.

In contrast, the described techniques and systems extend and modify bandwidth guarantees to ensure the timely execution of inference (and other) workloads under loaded system conditions. The power manager 212 utilizes a bandwidth manager 224 to allocate guaranteed bandwidth to the core 208 and/or application 210 based on the priority parameter 218 and QoS parameters 220. As with conventional techniques, the bandwidth manager 224 initially allocates a guaranteed bandwidth (e.g., a first or initial guaranteed bandwidth) to the core 208 (and other processing units of the processor 204) with generally equal guarantees. If the guarantee is insufficient to satisfy the QoS parameters 220 associated with the application 210, then the bandwidth manager 224 reallocates or reassigns a higher bandwidth guarantee (e.g., a second or updated guaranteed bandwidth) to the core 208 based on the priority parameter 218 and QoS parameters 220. This allows inference workloads to be dynamically assigned priority and QoS-derived bandwidth guarantees to better accommodate the timely execution of the application 210, especially in loaded system conditions.

As described in greater detail with respect to FIG. 3, the power manager 212 assigns a power-level setting 222 for the core 208 (or a portion thereof) based on the priority parameter 218 and the QoS parameters 220 associated with the workload. In particular, the power-level setting 222 indicates a voltage and frequency setting at which the core 208 (or a portion thereof) operates or will operate to execute the workload of the application 210. The bandwidth manager 224 then uses the assigned power-level setting 222 (e.g., from among a power-level table of a dynamic power manager) to allocate bandwidth guarantees (e.g., for executing the workload of the application 210). In this way, the bandwidth manager 224 configures the virtual channels or similar memory resources that access the memory system 206 to allocate bandwidth to meet the requirements of the application 210, thereby optimizing the operation of the device 202 and extending dynamic memory bandwidth management policies under loaded system conditions to improve latency among applications.

FIG. 3 is a block diagram of an example block diagram 300 of a framework for bandwidth management for real-time and best-effort clients under loaded system conditions. In this example, bandwidth guarantees are provided to ensure QoS specifications are satisfied (to the extent possible) for real-time and best-effort workloads. In particular, block diagram 300 illustrates bandwidth management for a first application 302 and second application 304 with different workloads.

A first core or processing unit (not illustrated) of the processor 204 executes the first application 302, which utilizes a large language model to provide cognitive artificial intelligence (AI) workloads. The first application 302 provides an input 306 specifying a first priority parameter 308 and first QoS parameter 310 via a QoS API 318. In the illustrated example, the first priority parameter 308 specifies a real-time priority. The first QoS parameter 310 specifies the bandwidth requirement for the workload of the first application 302. In some implementations, the first QoS parameter 310 also indicates a throughput requirement or deadline for completing the inference workload.

A second core or processing unit (not illustrated) of the processor 204 executes the second application 304, which utilizes a machine-learning model to assist with business productivity tasks. In other implementations, the first application 302 and the second application 304 execute other types of workloads. The second application 304 provides an input 312 specifying a second priority parameter 314 and second QoS parameter 316 via the QoS API 318. In the illustrated example, the second priority parameter 314 specifies a normal or "best-effort" priority. The second QoS parameter 316 specifies the bandwidth requirement for the workload of the second application 304.

The QoS API 318 is implemented in this example as part of a runtime that includes an artificial intelligence (AI) runtime and a runtime library. The runtime communicates with a hardware driver 320 having a solver, core, and memory storing precompiled machine-learning models and associated metadata, e.g., resource data. In the illustrated implementation, a single hardware driver 320 is communicatively coupled to the first application 302 and the second application 304. The hardware driver 320 is also communicatively coupled to the power manager 212. In other implementations, separate hardware drivers 320 are associated with each core or processor unit of the processor 204, with each hardware driver 320 communicatively coupled to the power manager 212.

The first application 302, for example, calls the QoS API 318 and provides the first priority parameter 308 as real-time and the first QoS parameter 310. The QoS API 318 provides these parameters to a hardware driver 320. As a result, a real-time QoS-based power level 322 is applied and submitted to a policy 326 associated with the first application 302.

The hardware driver 320 dynamically manages the power (e.g., voltage) and clock frequency for the core 208 that processes or executes the workload of the first application 302. A power-level table is also included in the hardware driver 320. The power-level table provides multiple potential power states (e.g., pairs of a voltage and frequency) at which to operate the core 208 (e.g., the IPU or other processing units). For example, the power states of the power-level table include operating frequencies of 2.0 gigahertz (GHz), 1.8 GHz, 1.6 GHz, 1.0 GHz, 200 MHz, and so forth. Example voltages in the power-level table range from 0.5 volts (V) to 1.3 V.

The second application 304 calls the QoS API 318 and provides the second priority parameter 314 as best-effort and the second QoS parameter 316. The QoS API 318 provides these parameters to the hardware driver 320. As a result, a best-effort QoS-based power level 324 is applied to the policy 326 associated with the second application 304.

In some implementations, a power manager driver or other circuitry also informs the hardware driver 320 of potential power states currently available for the hardware unit (e.g., a power-level table with voltage and frequency pairs). In some implementations, the potential power states depend on a current power-slider position and/or power source (e.g., AC versus DC).

The hardware driver 320 then assigns a particular power-level setting 222 to the first application 302 and the second application 304, respectively, based on the policy 326. For example, the first application 302 (with real-time priority) is guaranteed power levels such that throughput or latency QoS parameters are satisfied. In addition, resource prioritization is extended to the second application 304 (with best-effort priority and specified QoS parameters) to attempt to satisfy the respective throughput or latency QoS parameters as long as they do not contradict power-slider or power-source policies. If no throughput or latency parameters are provided, the associated workload is assigned a power level associated with the current power slider or power source policy.

The hardware driver 320 provides the policy 326 and power-level setting 222 associated with the first application 302 and the second application 304, respectively, to the power manager 212. The power manager 212 determines a bandwidth allocation 328 for the first application 302 and the second application 304, respectively, based on the corresponding power-level setting 222, QoS parameter, and policy 326. The bandwidth allocation 328 provides a bandwidth guarantee for each application. In this way, the power manager 212 extends bandwidth guarantees and/or prioritization to best-effort applications (e.g., the second application 304). Additional details of the bandwidth allocation 328 are provided with respect to the flow diagram of FIG. 5.

Figure 4:
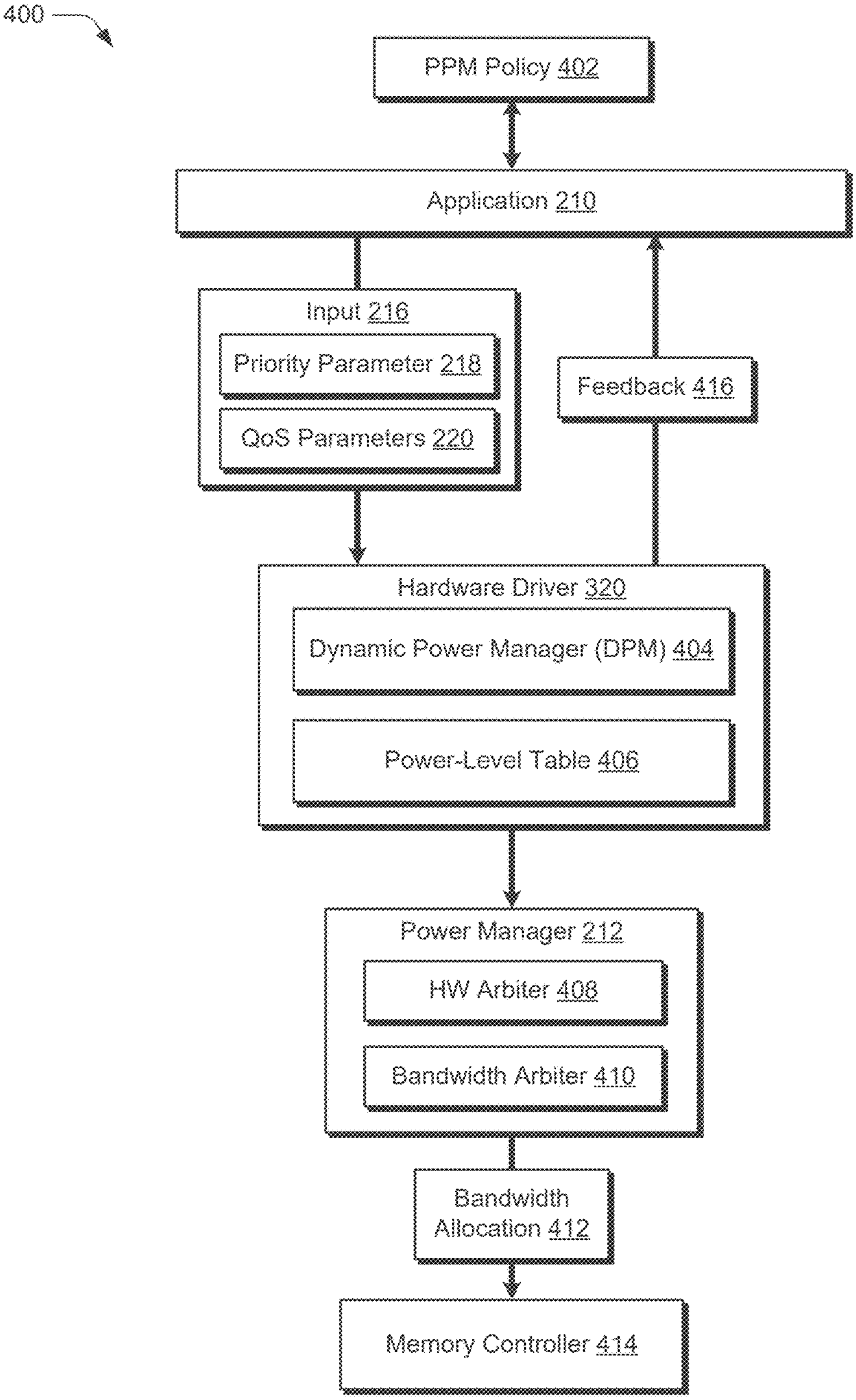
FIG. 4 is a block diagram of an example system showing the operation of a power manager and a hardware driver to implement bandwidth management for real-time and best-effort clients under loaded system conditions.

FIG. 4 is a block diagram of an example system 400 showing the operation of a power manager 212 and a hardware driver 320 to implement bandwidth management for real-time and best-effort clients under loaded system conditions. In system 400, power-level and bandwidth arbitration for application 210, which utilizes a machine-learning model to perform an AI workload, is illustrated.

The application 210 is configured to bi-directionally communicate a processor-power-management (PPM) policy 402 for the AI workload with the core 208 (not illustrated). The PPM policy 402 indicates a QoS profile for the core 208. As described above, the application 210 provides an input 216 to the hardware driver 320. The input 216 includes the priority parameter 218 and QoS parameters 220 for the AI workload.

In another implementation, the input 216 also includes resource data, which provides insights into the resources required for processing the workload. The workload in this implementation is deterministic, and by leveraging this, the resource data includes workload statistics that are determined and characterized during a compilation stage in generating the precompiled machine-learning models. The workload statistics are configurable as a serialized graph representation that describes resource consumption by the machine-learning models (e.g., a number of operations, data movement between layers of the model, and so forth). The power manager 212 is thus configured in this implementation to utilize indications by the QoS parameters 220 and priority parameter 218 to determine a minimum amount of bandwidth resources to be allocated to process the workload.

The hardware driver 320 includes a dynamic power manager (DPM) 404 that provides dynamic power management for the core 208. In particular, the DPM 404 enables the application 210 to specify the priority parameter 218 and QoS parameters 220 for processing the workload. A power-level table 406 is also included in the hardware driver 320. The power-level table 406 provides multiple potential power states (e.g., pairs of a voltage and frequency) at which to operate the core 208 (e.g., the IPU or other processing units).

The hardware driver 320 is communicatively coupled to the power manager 212 and provides the priority parameter 218 and QoS parameters 220 associated with the AI workload to a hardware (HW) arbiter 408, which represents logic of the power manager 212 to assign power level characteristics for the application 210. Based on the priority state (e.g., real-time versus best-effort) indicated by the priority parameter 218, the hardware arbiter 408 selects either a hard-minimum setting (e.g., also referred to as "hardmin") or a soft-minimum setting (e.g., also referred to as "softmin") operating state to provide to a hardware controller, which controls the power level (e.g., operating frequency and voltage) of the core 208, other processor units, or partitions thereof. The operating state is also provided as part of the policy 326, which is provided to a bandwidth arbiter 410.

In particular, a real-time priority is associated with or assigned the "hardmin" operating state, resulting in the QoS parameters 220 associated with a workload being satisfied, even at the expense of other workloads or applications via throttling. In other words, a power level within the power-level table 406 that satisfies the QoS parameters 220 is assigned to "hardmin" workloads. Often, such workloads are assigned the lowest power level within the power-level table 406 that satisfies the QoS parameters 220 to promote power efficiency.

A best-effort priority is associated with or assigned the "softmin" operating state. Under the "softmin" operating state, if the power level determined by the QoS parameters 220 is lower than a power-mode-derived power level, then the lower best-effort QoS-derived power level is selected for the core 208 to save power. In contrast, if the power level determined by the QoS parameters 220 is higher than a power-mode-derived power level, then the power-mode-derived power level is selected to satisfy the power-mode policy. If a workload does not specify any QoS parameters 220, then a default power-mode-derived power level is used.

The bandwidth arbiter 410 represents logic of the power manager 212 to determine a bandwidth allocation 412 (e.g., bandwidth guarantee) to provide the application 210. The bandwidth arbiter 410 considers the operating state assigned to the application 210 and the QoS parameters 220 to determine the bandwidth allocation 412. For example, if the application 210 has been assigned the "hardmin" operating state, the bandwidth arbiter 410 runs a virtual-channel QoS feature to ensure bandwidth needs (as indicated by the QoS parameters 220) of the core 208 to execute the application 210 are satisfied by adjusting virtual channel settings in a memory controller 414 or the data fabric between the processor 204 and the memory system 206. If the application has been assigned the "softmin" operating state, the bandwidth arbiter 410 assesses the priority of other applications or cores accessing the memory system 206 via the virtual-channel QoS feature to try to ensure the core 208 is guaranteed its bandwidth needs (as indicated by the QoS parameters). The bandwidth-management algorithm of the bandwidth arbiter 410 is provided in greater detail with respect to FIG. 5.

The memory controller 414 is a digital circuit (e.g., implemented in hardware or firmware) that manages the flow of data to and from the memory system 206. In some implementations, the memory controller 414 is communicatively located between and interfaces with the core 208 and the memory system 206. By way of example, the memory controller 414 includes logic to read and write to the memory system 206. For instance, the memory controller 414 receives instructions (e.g., a memory request) from the core 208. The instructions involve accessing data stored in memory 214 of the memory system 206 and providing the data to the core 208 (e.g., for execution of the application 210 by the core 208). The memory controller 414 assigns or implements bandwidth resources based on the bandwidth allocation 412.

A memory request illustrates an example instruction the memory controller 414 receives to access (e.g., read or write) data maintained in memory (e.g., memory 214). For example, the memory request represents a request made by the processor 204 (e.g., by the core 208) for data (e.g., requested data) involved as part of performing one or more operations of a computational task or program. In implementations where the requested data is not accessible via a cache system (not illustrated), the core 208 transmits the memory request to the memory controller 414, which causes the memory controller 414 to forward the memory request to the memory system 206. The memory request includes information describing one or more bits of data maintained in memory 214 (e.g., by specifying a memory address, a range of memory addresses, or combinations thereof) corresponding to locations in the memory system 206 at which the requested data are stored.

The hardware driver 320 also provides feedback 416 to the application 210 based on the assigned power level, power-mode policies, and/or bandwidth allocation 412. In particular, the feedback 416 includes an indication of the throttling of and bandwidth guarantees for the core 208.

Figure 5:
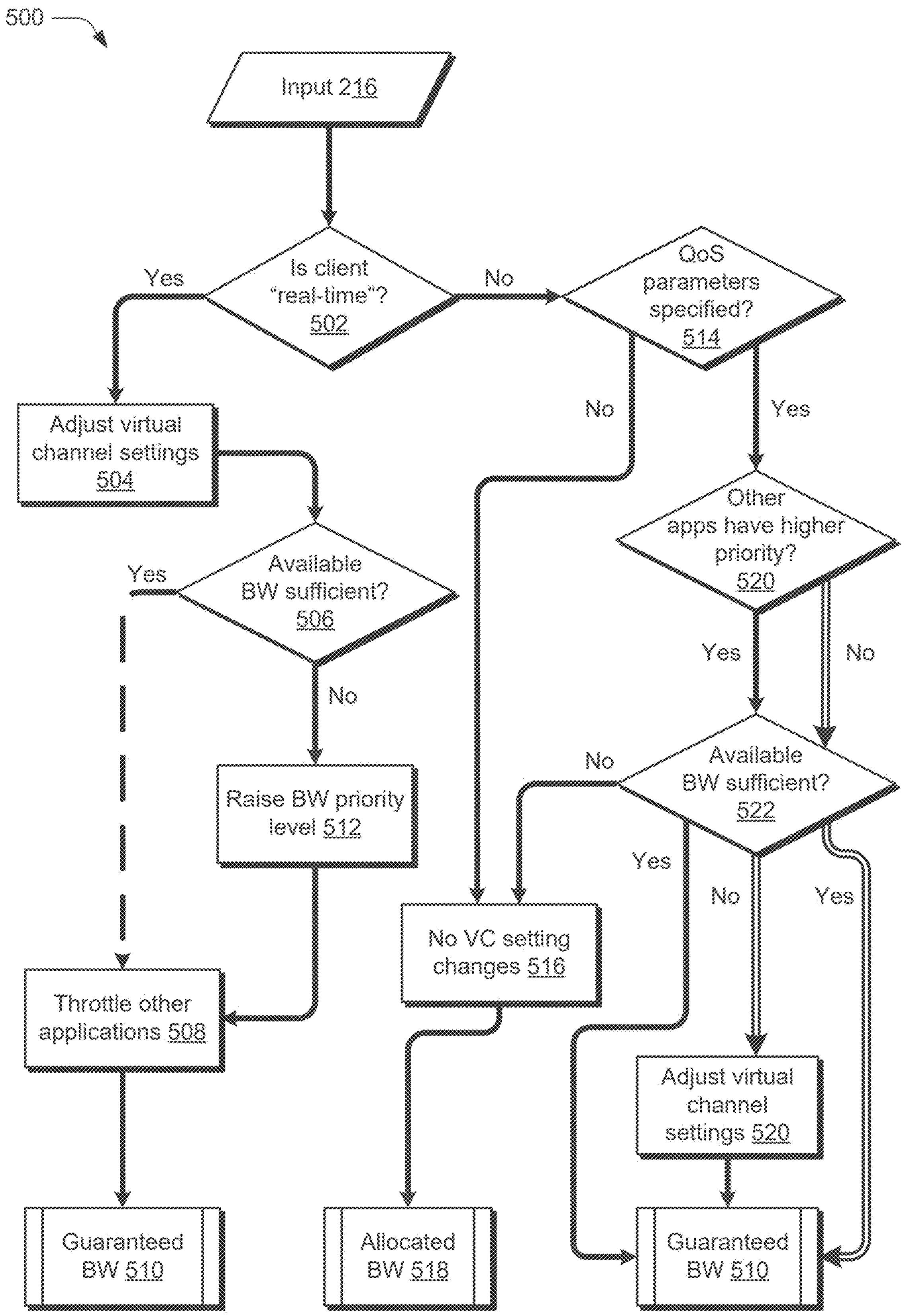
FIG. 5 depicts an algorithm for bandwidth management for real-time and best-effort clients under loaded system conditions.

FIG. 5 depicts an algorithm 500 for bandwidth management for real-time and best-effort clients under loaded system conditions. Algorithm 500 is shown as operations (or actions) performed, but not necessarily limited to the order or combinations in which the operations are shown herein. Any one or more operations may be repeated, combined, or reorganized to provide other algorithms. In portions of the following discussion, reference may be made to the systems and components of FIGS. 1 through 4, reference to which is made by example. The algorithm is not limited to performance by the mentioned systems and components.

An input is received via an API from a client, and it is determined whether the client has a real-time priority (block 502). The input specifies a priority parameter and QoS parameter for processing or executing a workload associated with the client. For example, a power manager 212 receives the input 216, including the priority parameter 218 and QoS parameter 220, via a QoS API 318 from the application 210. A bandwidth arbiter 410 determines whether the application 210 has a real-time or best-effort priority. In one implementation, the priority determination is determined based on the priority parameter 218. In another implementation, a hardware arbiter 408 determines to assign a "hardmin" or "softmin" operating state to the application 210 based on the priority parameter 218 and the QoS parameter 220. The bandwidth arbiter 410 then determines real-time or best-effort priority based on the indication of the "hardmin" or "softmin" operating state for the application 210.

If the client (or its workload) has a real-time priority (a "yes" determination at block 502), then a power manager adjusts virtual channel settings in a memory controller or data fabric associated with a memory system (block 504). For example, if the application 210 has a real-time priority, then the power manager 212 or the bandwidth arbiter 410 runs a virtual channel QoS functionality to ensure the bandwidth needs of the application 210 are satisfied by adjusting virtual channel settings in the memory controller 414 or the data fabric associated with the memory system 206.

The power manager then determines whether the available bandwidth is sufficient for the client (block 506). For example, the power manager 212 or the bandwidth arbiter 410 determines whether the available bandwidth for the application 210 is less than the minimum bandwidth required by the application 210 (as indicated by the QoS parameter 220). The available bandwidth is determined by subtracting a sum of the bandwidth used by other applications ("used bandwidth") from the total or theoretical bandwidth ("total bandwidth") available for the memory system 206. In another implementation, the available bandwidth is determined by subtracting a sum of the bandwidth guarantees provided to other applications ("guaranteed bandwidths") from the total bandwidth.

If the available bandwidth is sufficient for the client (a "yes" determination at block 506), then the bandwidth of other clients is optionally throttled (block 508). For example, if the available bandwidth for application 210 is sufficient to satisfy the QoS parameter 220 (based on the guaranteed bandwidths for other applications), then the power manager 212 or the bandwidth arbiter 410 assigns a guaranteed bandwidth 510 for application 210 that is equal to or greater than the minimum bandwidth required by the application 210. In another implementation, the guaranteed bandwidth 510 is provided to application 210 even if the power manager 212 applies power throttling for application 210 or other applications. If the available bandwidth is sufficient based on the used bandwidths but not the guaranteed bandwidths for other applications, then the guaranteed bandwidth 510 is allocated for application 210 by throttling or reducing the guaranteed bandwidths for the other applications. In some implementations, even if the current bandwidth used by another application is a small amount, the guaranteed bandwidth for that other application is throttled because its bandwidth usage can ramp or increase faster than the reaction time of the power manager 212 or the bandwidth arbiter 410.

If the available bandwidth is not sufficient for the client (a "no" determination at block 506), then the bandwidth priority level of the client is raised (block 512) and the bandwidth of other clients is throttled (block 508). For example, if the available bandwidth for application 210 is not sufficient to satisfy the QoS parameter 220 (based on the guaranteed bandwidths or used bandwidths for other applications), then the power manager 212 or the bandwidth arbiter 410 raises the bandwidth priority level of the application 210. Generally, each application (including application 210) defaults to a low bandwidth-priority level to avoid scheduling inefficiencies in the memory controller 414 and/or to enable scheduling by bandwidth-priority level. To guarantee the bandwidth for application 210 (at block 512), its bandwidth-priority level is raised from low to medium (or higher). In some implementations, the bandwidth-priority level increase is performed before the next set of memory requests are issued (e.g., the power manager 212 waits for previous memory requests to come back or be fulfilled by the memory system 206).

In one implementation, the bandwidth of other applications is throttled by throttling any best-effort workloads of the other applications, which results in a higher free pool of bandwidth to increase the guaranteed bandwidth 510 for the application 210. In another implementation, only other applications with the same or lower bandwidth-priority levels are throttled to provide the guaranteed bandwidth 510.

If the client (or its workload) has a best-effort priority (a "no" determination at block 502), then the power manager determines whether the client has specified QoS parameters for the workload (block 514). For example, if application 210 has a best-effort priority, then the power manager 212 or the bandwidth arbiter 410 determines whether application 210 also provided QoS parameters 220 (e.g., via the QoS API 318).

If the client (or its workload) did not specify QoS parameters (a "no" determination at block 514), then the power manager does not adjust virtual channel settings (block 516) and assigns a (best-effort or normal) allocated bandwidth 518 to the client. For example, if application 210 has a best-effort priority (or a real-time priority) with no QoS parameters 220 specified, then the power manager 212 or the bandwidth arbiter 410 does not adjust virtual channel settings in the memory controller 414 or the data fabric. In other words, the virtual channel QoS functionality in the bandwidth arbiter 410 assigns the (best-effort or normal) allocated bandwidth 518 to the application 210.

If the client (or its workload) specified QoS parameters (a "yes" determination at block 514), then the power manager determines whether other clients have a higher bandwidth priority (block 520). For example, if application 210 has a best-effort priority with QoS parameters 220 specified, then the power manager 212 or the bandwidth arbiter 410 determines whether the other applications have been assigned a higher bandwidth priority. The higher bandwidth priority for other applications is determined based on the other applications having a bandwidth usage higher than their guaranteed bandwidth or having a real-time priority (or "hardmin" operating state).

If the other clients have a higher bandwidth priority (a "yes" determination at block 520), the power manager determines whether the available bandwidth is sufficient for the client (block 522). For example, the power manager 212 or the bandwidth arbiter 410 determines whether the available bandwidth for the application 210 is less than the minimum bandwidth required by the application 210 (as indicated by the QoS parameters 220). The available bandwidth is determined by subtracting the used bandwidth for the other applications from the total bandwidth. In another implementation, the available bandwidth is determined by subtracting guaranteed bandwidths from the total bandwidth.

If the available bandwidth is not sufficient for the client (a "yes" determination at block 520 and a "no" determination at block 522), then the power manager does not adjust virtual channel settings (block 516) and assigns a (best-effort or normal) allocated bandwidth 518 to the client (as described previously).

If the available bandwidth is sufficient for the client (a "yes" determination at block 520 and a "yes" determination at block 522), then a guaranteed bandwidth is allocated for the client. For example, if the other applications have a higher bandwidth priority, but the available bandwidth for application 210 (based on used bandwidth or guaranteed bandwidths for the other applications) is sufficient to satisfy the QoS parameters 220, then the power manager 212 or the bandwidth arbiter 410 assigns a guaranteed bandwidth 510 for application 210 that is equal to the minimum bandwidth required by the application 210.

If the other clients have a higher bandwidth priority (a "no" determination at block 520 as represented by the double-lined arrow), the power manager determines whether the available bandwidth is sufficient for the client (block 522). For example, the power manager 212 or the bandwidth arbiter 410 determines whether the available bandwidth for application 210 is less than the minimum bandwidth required by application 210 (as indicated by the QoS parameters 220). The available bandwidth is determined by subtracting the used bandwidth for the other applications from the total bandwidth. In another implementation, the available bandwidth is determined by subtracting guaranteed bandwidths from the total bandwidth.

If the available bandwidth is sufficient for the client (a "no" determination at block 520 and a "yes" determination at block 522 as represented by the double-lined arrows), then a guaranteed bandwidth is allocated for the client. For example, if the other applications have the same or lower bandwidth priority, but the available bandwidth for application 210 (based on used bandwidth or guaranteed bandwidths for the other applications) is sufficient to satisfy the QoS parameters 220, then the power manager 212 or the bandwidth arbiter 410 assigns a guaranteed bandwidth 510 for application 210 that is equal to the minimum bandwidth required by the application 210.

If the available bandwidth is not sufficient for the client (a "no" determinations at blocks 520 and 522 as represented by the double-lined arrows), the power manager adjusts virtual channel settings (block 520) and assigns a guaranteed bandwidth 510 to the client. For example, if application 210 has a best-effort priority with the same or higher bandwidth priority than other applications but insufficient bandwidth is available, then the power manager 212 or the bandwidth arbiter 410 runs the virtual channel QoS functionality to ensure the bandwidth needs of application 210 are satisfied by adjusting virtual channel settings in the memory controller 414 or the data fabric. In one implementation, the guaranteed bandwidth 510 is provided to application 210 even if the power manager 212 applies power throttling for application 210 or other applications 210.

Figure 6:
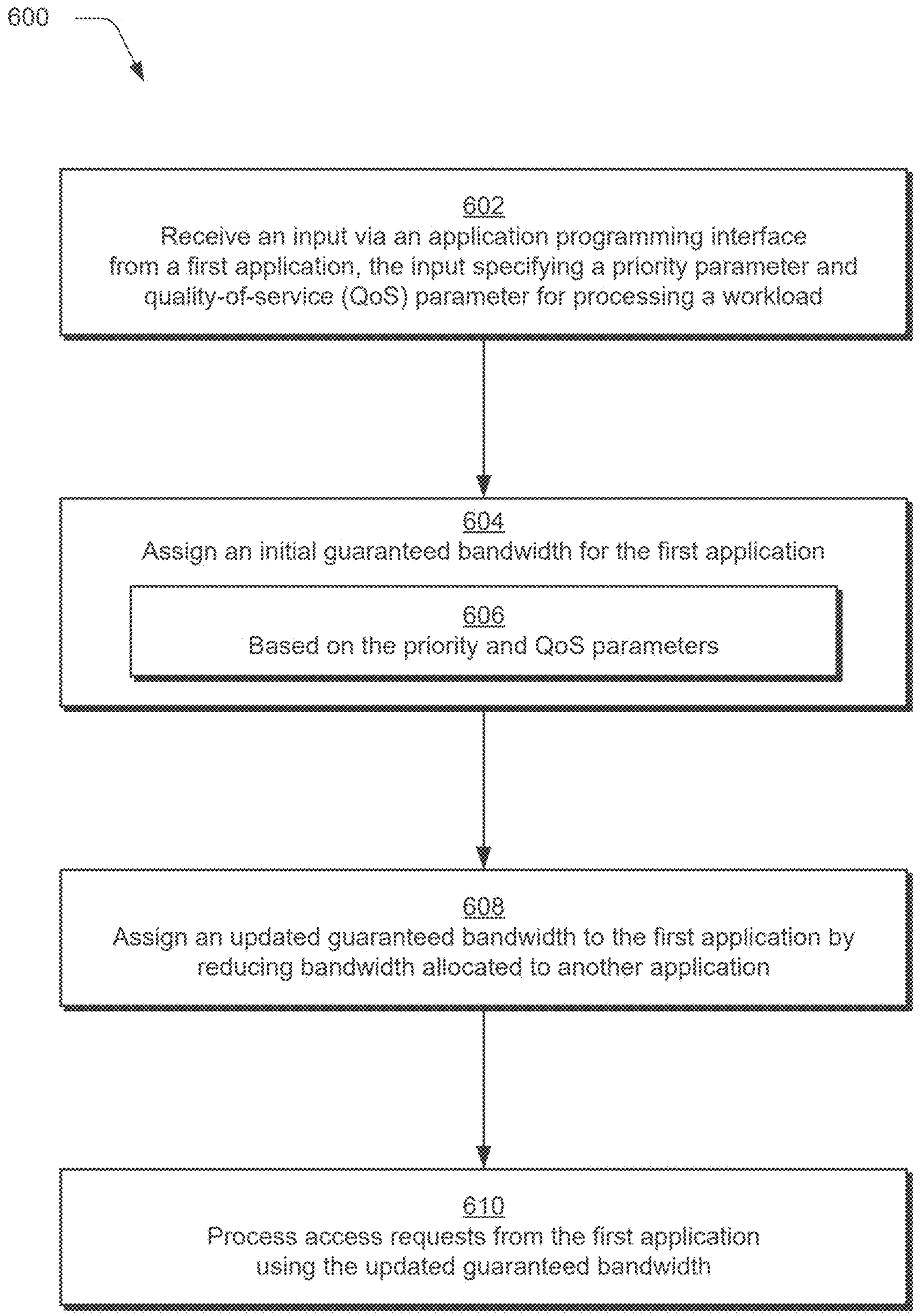
FIG. 6 depicts a procedure for bandwidth management of real-time and best-effort clients under loaded system conditions.

FIG. 6 depicts a procedure 600 for bandwidth management of real-time and best-effort clients (e.g., inference models) under loaded system conditions. The procedure 600 is shown as operations (or actions) performed, but not necessarily limited to the order or combinations in which the operations are shown herein. Any one or more operations may be repeated, combined, or reorganized to provide other algorithms. In portions of the following discussion, reference may be made to the systems and components of FIGS. 1 through 5, reference to which is made by example. The algorithm is not limited to performance by the mentioned systems and components.

An input is received via an application programming interface from a first application (block 602). The input specifies a priority parameter and QoS parameter for processing a workload associated with the first application. For example, a power manager 212 receives the input 216, including the priority parameter 218 and the QoS parameter 220, via a QoS API 318.

An initial guaranteed bandwidth for accessing data stored in memory is assigned to the first application (block 604). For example, the initial guaranteed bandwidth is selected based on the priority parameter 218 (e.g., real-time, power-band, or best-effort) and the QoS parameters 220 (e.g., latency or throughput) (block 606).

In response to determining that the initial guaranteed bandwidth for the first application is not sufficient to satisfy the QoS parameters 220 and that there is no unassigned bandwidth, an updated guaranteed bandwidth is assigned to the first application (block 608). The updated guaranteed bandwidth is larger than the initial guaranteed bandwidth. The additional guaranteed bandwidth is allocated to the first application by reducing the bandwidth allocated to one or more second applications.

Memory access requests from the first application are processed using the updated guaranteed bandwidth (block 610).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 202, processor 204, memory system 206, core 208, application 210, and power manager 212) are implemented in any of a variety of different manners such as hardware circuitry, software or firmware executing on a programmable processor, or any combination of two or more of hardware, software, and firmware. The methods provided are implemented in a variety of devices, such as a processor or processor core. Suitable processors include, by way of example, a special-purpose processor, inference processing unit, accelerated processing unit, digital signal processor (DSP), neural network engine (NNE), graphics processing unit (GPU), parallel accelerated processor, multiple microprocessors, one or more microprocessors in association with DSP cores, controllers, microcontrollers, Application Specific Integrated Circuits (ASICs), Field Programmable Gate Arrays (FPGAs) circuits, other types of integrated circuits (ICs), and/or state machines.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include read-only memory (ROM), random access memory (RAM), a register, cache memory, semiconductor memory devices, magnetic media such as internal hard disks and removable disks, magneto-optical media, and optical media.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A device comprising:

a power manager configured to:

assign, to a first application of one or more processor cores, an initial bandwidth allocation for accessing data stored in a memory, the initial bandwidth allocation being based on a first quality-of-service (QoS) parameter for the first application to process a workload; and in response to a determination that the initial bandwidth allocation is insufficient to satisfy the first QoS parameter and that there is no unassigned bandwidth, assign an updated bandwidth allocation to the first application by reducing bandwidth allocated to one or more second applications having a priority parameter equal to or lower than a priority parameter of the first application, the updated bandwidth allocation being larger than the initial bandwidth allocation.

2. The device of claim 1, wherein reducing the bandwidth allocated to the one or more second applications comprises reducing, stepwise until delivered memory-access throughput to the first application satisfies the first QoS parameter, a number of outstanding memory requests permitted to issue from the one or more second applications or a scheduler priority associated with the one or more second applications.

3. The device of claim 1, wherein the power manager is further configured to, in response to determining that the updated bandwidth allocation is insufficient to satisfy the first QoS parameter, raise a priority parameter of the first application from a first level to a second level, the second level having a higher priority in memory-access ordering than the first level.

4. The device of claim 3, wherein the power manager is further configured to determine the priority parameter of the first application is equal to the second level by identifying that the first application has a hard-minimum power setting.

5. The device of claim 3, wherein the power manager is further configured to, in response to the priority parameter of the first application being equal to the first level and the first QoS parameter not having a specified value, set the initial bandwidth allocation based on bandwidth allocations assigned to the one or more second applications.

6. The device of claim 3, wherein the power manager is further configured to, in response to the priority parameter of the first application being equal to the first level and the first QoS parameter specifying a minimum bandwidth requirement, determine whether priority parameters of the one or more second applications have a higher priority level; and in response to the priority parameters of the one or more second applications not having a higher priority level than the priority parameter of the first application and the initial bandwidth allocation being insufficient to satisfy the first QoS parameter, reduce bandwidth allocations to the one or more second applications to assign the updated bandwidth allocation to the first application.

7. The device of claim 1, wherein the first application is an inference model, a machine learning model, or an artificial intelligence model.

8. The device of claim 3, wherein the power manager is further configured to, in response to determining that the updated bandwidth allocation is insufficient to satisfy the first QoS parameter, reduce the bandwidth allocated to the one or more second applications based on an amount of bandwidth being consumed by the one or more second applications.

9. The device of claim 3, wherein the first application and the one or more second applications default to the first level, the first level being a best-effort priority.

10. The device of claim 4, wherein the power manager is further configured to maintain the initial bandwidth allocation or the updated bandwidth allocation in response to the first priority parameter of the first application being equal to the second level and the first application being subject to power throttling by reducing a voltage or frequency setting of the one or more processor cores.

11. The device of claim 6, wherein the power manager is further configured to maintain the initial bandwidth allocation for the first application:

in response to the one or more second applications not having a higher priority level than the first application; or in response to the one or more second applications having a higher priority level than the first application and determining that the initial bandwidth allocation is sufficient to satisfy the first QoS parameter.

12. A system comprising:

a power manager associated with a processor core and configured to:

receive an indication of a quality-of-service (QoS) parameter for processing a workload;

receive operation data describing operating characteristics of the processor core and one or more other processor cores; and assign, to the processor core, an initial bandwidth allocation for accessing data stored in a memory communicatively coupled to the processor core, the initial bandwidth allocation being based on the QoS parameter and the operating characteristics; and a memory controller associated with the processor core and the one or more other processor cores, the memory controller configured to:

reduce bandwidth allocation to the one or more other processor cores in response to a determination that the initial bandwidth allocation is insufficient to satisfy the QoS parameter and that there is no unassigned bandwidth, to provide an updated bandwidth allocation to the processor core, the updated bandwidth allocation being larger than the initial bandwidth allocation.

13. The system of claim 12, wherein a priority parameter of the processor core indicates the workload has a first level and other priority parameters associated with the one or more other processor cores indicate a same or lower priority; and the memory controller is configured to raise a priority of the processor core from the first level to a second level, the second level having a higher priority in memory-access ordering than the first level.

14. The system of claim 12, wherein the workload of the processor core includes execution of a machine learning model, inference model, or an artificial intelligence model.

15. The system of claim 12, wherein:

the operating characteristics comprise measured memory-access throughput data or queue depth data obtained from the memory controller via telemetry; and the power manager is further configured to reduce the bandwidth allocation to the one or more other processor cores stepwise, based on the measured memory-access throughput data, until a memory-access throughput for the processor core satisfies the QoS parameter.

16. The system of claim 12, wherein the processor core comprises an inference processing unit, a neural network engine, an intelligence processing unit, a neural processing unit, an artificial intelligence accelerator, or a vision processing unit.

17. The system of claim 13, wherein the power manager is further configured to determine a power setting for the processor core based on the priority parameter and the QoS parameter, the power setting indicating a clock frequency associated with the processor core; and determine the initial bandwidth allocation or the updated bandwidth allocation for the processor core based at least in part on the clock frequency.

18. The system of claim 16, wherein the memory comprises dynamic random access memory and the memory controller comprises a data fabric operatively connected to the processor core and the memory.

19. A method comprising:

receiving an input via an application programming interface (API) from an application of a processor core, the input specifying quality-of-service (QoS) parameter for processing a workload associated with the application;

determining, for the application, an initial bandwidth allocation for accessing data stored in a memory to process the workload, the initial bandwidth allocation being based at least in part on the QoS parameter; and in response to determining that the initial bandwidth allocation is insufficient to satisfy the QoS parameter and that there is no unassigned bandwidth, assigning an updated bandwidth allocation to the application by reducing bandwidth allocated to other applications having a priority parameter equal to or lower than a priority parameter of the application, the updated bandwidth allocation being larger than the initial bandwidth allocation.

20. The method of claim 19, wherein the method further comprises, in response to determining that the updated bandwidth allocation is insufficient to satisfy the QoS parameter, raising the priority parameter of the application from a first level to a second level, the second level providing the application a higher priority in memory access ordering.

* * * * *